(12) United States Patent
Bazhenov et al.

(10) Patent No.: US 9,195,935 B2
(45) Date of Patent: Nov. 24, 2015

(54) PROBLEM SOLVING BY PLASTIC NEURONAL NETWORKS

(71) Applicant: THE REGENTS OF THE UNIVERSITY OF CALIFORNIA, Oakland, CA (US)

(72) Inventors: Maxim Bazhenov, San Diego, CA (US); Peter Lonjers, Riverside, CA (US); Steven Skorheim, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 267 days.

(21) Appl. No.: 13/840,539

(22) Filed: Mar. 15, 2013

(65) Prior Publication Data
US 2014/0012789 A1  Jan. 9, 2014

Related U.S. Application Data

(60) Provisional application No. 61/640,517, filed on Apr. 30, 2012.

(51) Int. Cl.
*G06N 3/08* (2006.01)
*G06N 3/02* (2006.01)
*G06N 3/04* (2006.01)
*G06N 99/00* (2010.01)

(52) U.S. Cl.
CPC .. *G06N 3/08* (2013.01); *G06N 3/02* (2013.01); *G06N 3/049* (2013.01); *G06N 99/005* (2013.01)

(58) Field of Classification Search
CPC ..................................................... G06N 3/08
See application file for complete search history.

(56) References Cited

U.S. PATENT DOCUMENTS

| | | | | |
|---|---|---|---|---|
| 5,592,589 | A * | 1/1997 | Poon ............................. | 706/25 |
| 7,904,398 | B1 * | 3/2011 | Repici .......................... | 706/15 |
| 2004/0143559 | A1 * | 7/2004 | Ayala ........................... | 706/13 |
| 2008/0162391 | A1 * | 7/2008 | Izhikevich .................... | 706/25 |

OTHER PUBLICATIONS

Lonjers, Peter, Steven Skorheim, and Maxim Bazhenov, (May 2011), "Problem solving using rewarded STDP", presented at the Joint Symposium on Neural Computational in May of 2011, 1 page.
Miller, P. and D. Katz, (2010) Stochastic Transitions between Neural States in Taste Processing and Decision-Making. The Journal of Neuroscience 3047-09.2010.
Rulkov, N. F., Timofeev, I, Bazhenov, M., "Oscillations in Large-Scale Cortical Networks: Map-Based Model ", J Comput Neurosci. 2004,17(2):203-23.
Razak and Zoltan M. Fuzessery, "Facilitatory Mechanisms Underlying Selectivity for the Direction and Rate of Frequency Modulated Sweeps in the Auditory Cortex", J Neurosci, 2008,28(39):9806-9816.
Razak KA, Fuzessery ZM. J Neurosci, "Development of inhibitory mechanisms underlying selectivity for the rate and direction of frequency-modulated sweeps in the auditory cortex", 2007, 27(7):1769-81.

* cited by examiner

*Primary Examiner* — Alan Chen
(74) *Attorney, Agent, or Firm* — Kilpatrick Townsend & Stockton LLP

(57) ABSTRACT

More realistic neural networks are disclosed that are able to learn to solve complex problems though a decision making network, modeled as a virtual entity foraging in a digital environment. Specifically, the neural networks overcome many of the limitations in prior neural networks by using rewarded STDP bounded with rules to solve a complex problem.

16 Claims, 10 Drawing Sheets

PROBLEM SOLVING BY PLASTIC NEURONAL NETWORKS

CROSS-REFERENCES TO RELATED APPLICATIONS

This application claims the benefit of and priority to U.S. Provisional Application Ser. No. 61/640,517, filed 30 Apr. 2012 and entitled "Problem Solving by Plastic Neuronal Networks," the contents of which are incorporated by reference.

STATEMENT AS TO RIGHTS TO INVENTIONS MADE UNDER FEDERALLY SPONSORED RESEARCH AND DEVELOPMENT

This invention was made with government support under grant no. A01093-30029-44-NNMVB awarded by the National Institutes of Health. The government has certain rights in the invention.

FIELD OF THE INVENTION

This invention relates to problem solving capabilities of spiking neuron model networks using rewarded STDP.

BACKGROUND OF THE INVENTION

Rewarded spike timing dependent plasticity (STDP) has been implicated as a possible learning mechanism in a variety of brain systems, including artificial neural networks. This mechanism combines unsupervised STDP that modifies synaptic strength depending on the relative timing of presynaptic input and postsynaptic spikes together with a reinforcement signal that modulates synaptic changes. Neural networks seek to duplicate the ability of biological neural networks to solve complex problems. Thus, one goal of implementing artificial neural networks is to implement the network so that it can learn and solve complex problems without input from a programmer or user.

However, neural networking is a relatively new science and validating whether current models can solve problems is difficult. Typically current models are validated only by comparison with experimental data, which usually does not guarantee that these models are capable of problem solving. This disclosure introduces a model that is capable of learning and decision-making based on the learning experience and thus is validated by its problem solving capability.

The attempts to use neural networks for problem solving has been done before in artificial neural networks. Artificial neural networks have been theorized to solve problems since Alan Turing's B-machines in the 1940s. These artificial neural networks typically consist of three layers of neurons. An input, hidden and output layer connected in an all to all feed-forward pattern between layers. Each neuron consists of a non-liner summation of input function scaled by incoming connection strengths. Ultimately the network is a function that can be used for analyzing data by presenting data to the input layer and reading the resulting outputs of the output layer. A typical use of such a network is to solve classification problems.

Further developments of these type of models have led to vastly improved capabilities. However despite mimicking biological networks in many respects major differences exist. Canonically artificial neural networks use back propagation to enable reinforcement or supervised learning. It has long been known that biological networks do not use this powerful technique and instead use some variant of hebbian plasticity. Furthermore, artificial neural networks can ignore issues of homeostasis due to lack of a temporal dimension. This stems from the neurons not being constrained to all or nothing output and synaptic communication as most biological neurons are. Greatly attenuating the problem of signal to noise. Artificial networks can avoid the distal reward problem because input and reward can be artificially correlated in time.

The distal reward problem arises because the mechanisms of reinforcement learning must be dependent on both the network activity and a reward signal. In any biological organism, the reward is often not received until several seconds after the activity which resulted in the correct response. This creates a problem of how this strategy can be implemented in computational algorithms mimicking biological system. When reward signal arrives, the relevant activity has long since subsided and the relevant neurons and connections may well have been involved on other activities during this period. Rewarded spike time dependent plasticity is proposed as a solution to this problem. It has been proposed that spike time dependent traces are created and in some way stored at a synaptic terminal whenever the pre and post synaptic neuron both experience firing events. These traces are positive when the presynaptic neuron fires first and strong when the events occur close together in time. When these traces are later reinforced by receiving a reward signal (often believed to be dopamine) they turn into long term changes in synaptic strength.

BRIEF SUMMARY OF THE INVENTION

More realistic neural networks are disclosed that are able to learn to solve complex problems though a decision making network, modeled as a virtual entity foraging in a digital environment. Specifically, the neural networks overcome many of the limitations in prior neural networks by using rewarded STDP bounded with rules to solve a complex problem.

According to a feature of this disclosure, a computer product comprising a non-transitory computer readable medium storing a plurality of instructions that when executed control neural network on a computer system to self-learn to solve a complex problem, the instructions is disclosed comprising, in a time period for a neural network comprising an input layer of input neurons, a hidden layer of hidden neurons, and an output layer of output neurons, each input neuron having first synapses in electrical or chemical communication with at least one hidden neuron and each hidden neuron having second synapses in electrical or chemical communication with a plurality of the output neurons: receiving an input in at least one input neuron; propagating a first electrical or chemical communication from the at least one input neuron that received the input to at least one hidden neuron via at least one first synapse; propagating a second electrical or chemical communication from the at least one hidden neuron that received the first communication from the input neuron to a plurality of output neurons, the second communication having variable strength for each hidden neuron to each of the plurality of output neurons in which the hidden neuron is in communication according to a strength of each second synapse; making a decision based on the second communication according to a rule; providing a reward if the result of the decision contributes to the solving of the problem; wherein if a reward is provided, the strength of second synapses that contributed to the solving of the problem are adjusted, whereby the neural network is more likely to repeat the decision in at future time periods.

According to a feature of this disclosure, a method of for inducing self-learning in a neural network implemented on a computer is disclosed comprising, in a time period for a neural network comprising an input layer of input neurons, a hidden layer of hidden neurons, and an output layer of output neurons, each input neuron having first synapses in electrical or chemical communication with at least one hidden neuron and each hidden neuron having second synapses in electrical or chemical communication with a plurality of the output neurons: receiving an input in at least one input neuron; propagating a first electrical or chemical communication from the at least one input neuron that received the input to at least one hidden neuron via at least one first synapse; propagating a second electrical or chemical communication from the at least one hidden neuron that received the first communication from the input neuron to a plurality of output neurons, the second communication having variable strength for each hidden neuron to each of the plurality of output neurons in which the hidden neuron is in communication according to a strength of each second synapse; making a decision based on the second communication according to a rule; providing a reward if the result of the decision contributes to the solving of the problem; wherein if a reward is provided, the strength of second synapses that contributed to the solving of the problem are adjusted, whereby the neural network is more likely to repeat the decision in at future time periods.

According to a feature of this disclosure, a neural network system implemented in an artificial intelligence and configured to solve complex problems by self-learning is disclosed comprising an input layer of artificial neurons; at least one hidden layer of artificial neurons having first synapses in electrical or chemical communication with the input layer of artificial neurons; a output layer of artificial neurons having second synapses in electrical or chemical communication with the at least one hidden layer of artificial neurons; a rewarder configured to provide an input to the neural network wherein at least strengths of the second synapses that caused the reward to be provided are adjusted; wherein the neural network maintains homeostatic stability; and wherein incoming and outgoing synaptic communication is balanced.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
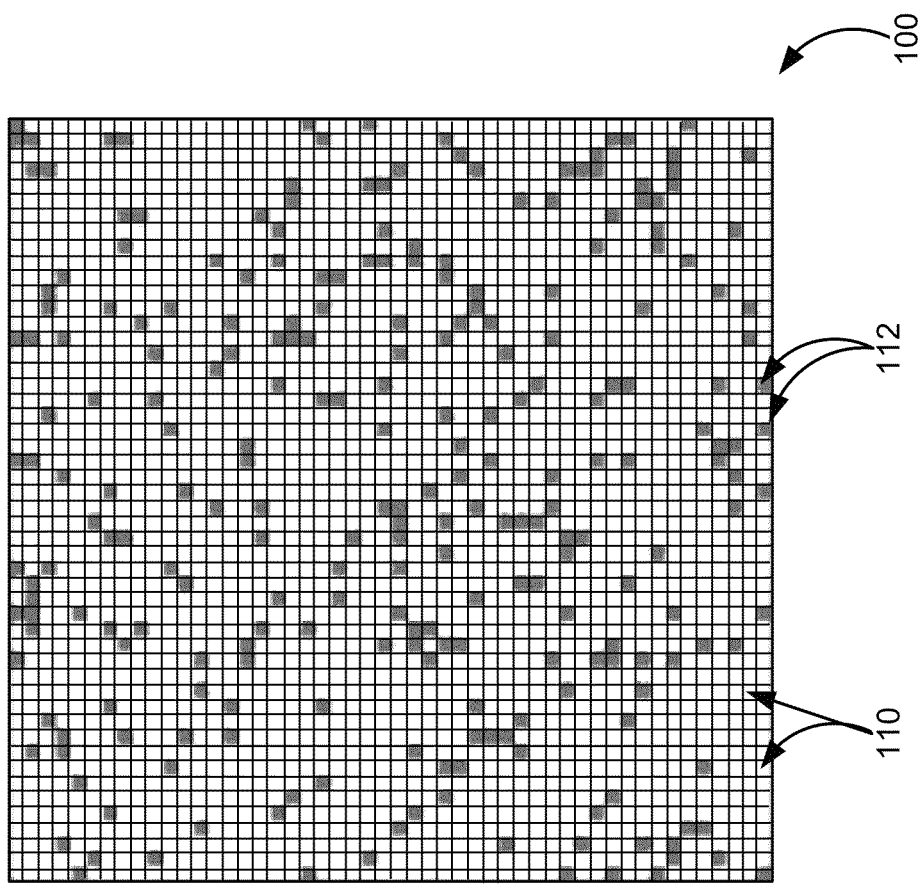
FIG. 1 is block diagram of a virtual foraging environment.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. As used in the present disclosure, the term "or" shall be understood to be defined as a logical disjunction and shall not indicate an exclusive disjunction unless expressly indicated as such.

Rewarded spike timing dependent plasticity (STDP) has been implicated as a possible learning mechanism in neural networks, which helps a neural network learn to solve complex problems. STDP is a plasticity mechanism that strengthens synapses in the event of closely timed pre-synaptic before post-synaptic neuron firing. Conversely, the synapse is weakened in the case of post-synaptic before presynaptic firing. According to embodiments, rewards are used to change synapses. Thus, according to embodiments, the neural network models disclosed herein implement rewarded STDP, which allows the neural networks disclosed herein to self-learn and thereby solve complex problems.

In this disclosure, a more realistic neural network is disclosed. It is able to solve complex problems though a decision making network, modeled as a virtual entity foraging in a digital environment. Specifically, the neural networks disclosed herein overcome many of the limitations in prior neural networks by using rewarded STDP to solve a complex problem.

According to an exemplary embodiment, rewarded STDP implemented with additional constrains as described below is successfully used to teach a virtual entity near optimal foraging behavior. The virtual entity is explores a virtual foraging environment and gathers the virtual food, which is randomly distributed throughout the foraging environment. The virtual entity receives virtual sensory input corresponding to food in its local area. The specific sensory input received is not relevant to the neural networks disclosed herein; however, as a conceptual tool one can think of the virtual entity as a mouse and the sensory input as sight. Thus, the virtual mouse is able to "see" a limited area of the forging environment.

The neural network, which can be conceptualized as a primitive brain of the virtual entity, will move based on the output of its neural network after receiving the input, for example conceptualized as seeing nearby food or not seeing nearby food. The virtual entity moves through its environment dependent upon the activity of its neural network, which according to this environment learns near optimal forging behavior.

Specifically, the neural network of the virtual entity comprises a network of map based spiking neurons, as disclosed herein. According to embodiments, the neural network incorporates both excitatory and inhibitory neurons. The virtual entity is rewarded when it arrives at a location in the foraging environment that contains food, and the neural network solidifies recently created STDP event traces.

The foraging behavior took place in a simulated environment of randomly distributed "food" particles. Input to the network corresponded to the locations of local "food." During each time period direction of the movement was controlled by the activity of a group of output neurons. Reward was applied to the network when the movement led to acquisition of a "food" particle. It was used to solidify recently created STDP event traces. Over the course of the training period the network, which begins with a set of synaptic connections of uniform strength, develops into a network capable of producing near optimal foraging behavior. Rewarded STDP alone was not sufficient to learn foraging behavior due to the difficulty maintaining homeostatic equilibrium. This algorithm can be applied to implement learning behavior of the virtual subjects in computer games.

When creating models of learning in neural networks for the purpose of better understanding how the brain processes information it is valuable to address difficult learning problems with realistic mechanisms. This model move towards this goal by building a network of map based neurons capable of learning to solve a foraging problem using rewarded spike timing dependent plasticity as the learning mechanism.

Accomplishing this required overcoming a number of issues not present in earlier models with similar goals. In this model, sharing information between neurons was avoided except through synaptic communication. This combined with the implementation of a temporal dimension necessitated the use of alternative learning mechanism as opposed to those used in artificial intelligence neural networks. The foraging problem used in this model provided a more naturalistic setting for learning using a simple neural network Neural Network Model According to embodiments, rewarded STDP was implemented as part of a spiking network model of excitatory neurons and inhibitory interneurons. The model was composed of four groups of neurons arranged into three layers:

(1) an input layer;
(2) a hidden layer comprising an excitatory layer and inhibitory layer; and
(3) an output layer responsible for decision-making As the virtual entity is rewarded upon successful moves locations within a foraging environment that contain food, the synapses that led to the successful acquisition of food are strengthened. In effect, the strengthened synapses are the result of learning and over time the virtual entity has learned to solve the foraging problem with near optimal success.

According to an exemplary embodiment, a neural networks model's features comprises the following features (1)-(8) below. Using these features, an exemplary neural network was successfully tested for it its ability to solve a complex problem: to model basic foraging behavior of a simulated organism in a foraging environment.

Figure 2:
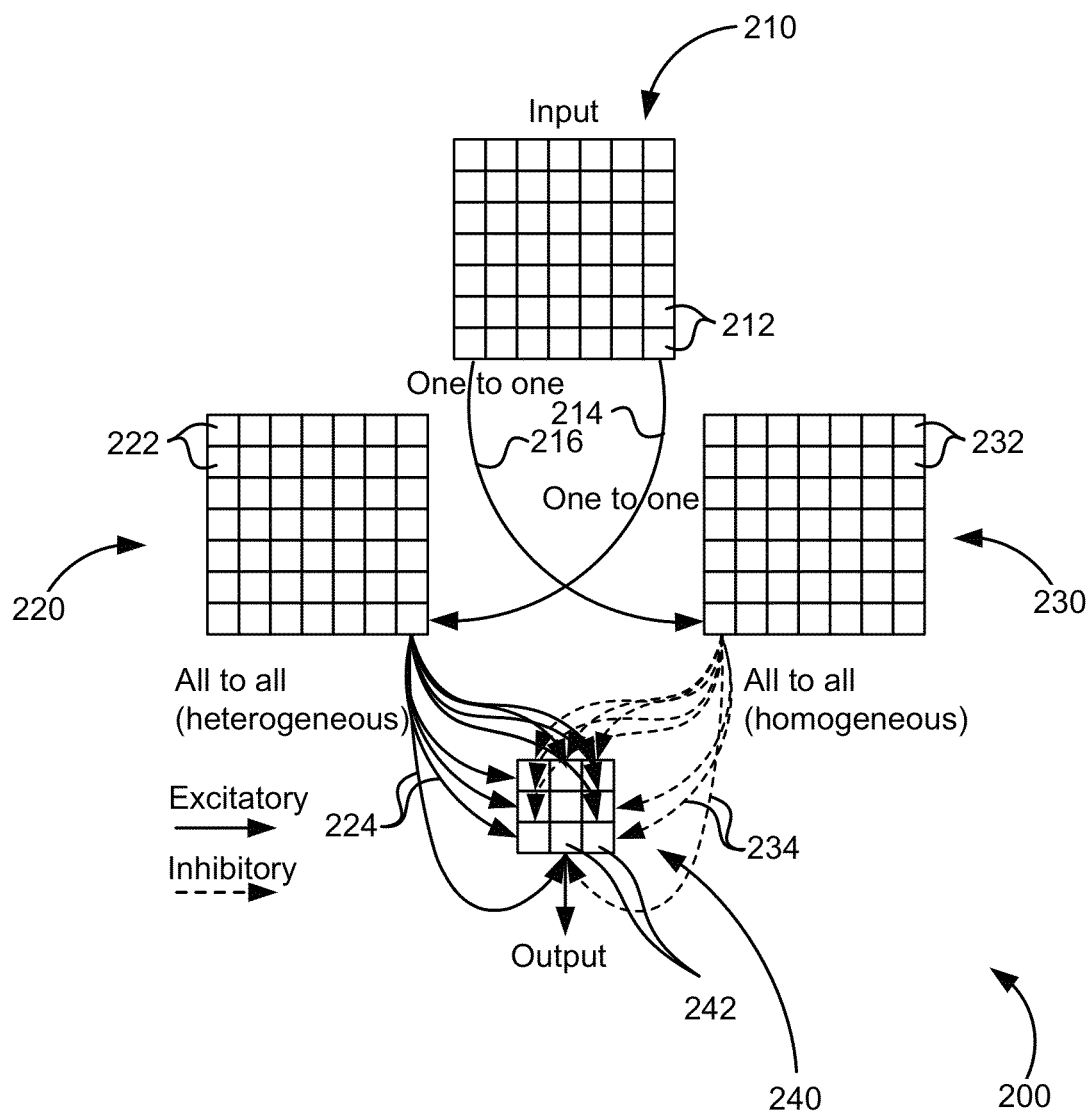
FIG. 2 is a block diagram illustrating the interconnectedness of a plurality of neurons in a neural network according embodiments disclosed herein.

(1) The model implements input layer 210 (representing sensory input to the model), two hidden layers 220, 230(excitatory and inhibitory), and output layer 240 (representing decision), as illustrated in FIG. 2. Hidden inhibitory layer 230 provides feed-forward inhibition via synaptic connectivity 234 to output layer 240. Synaptic connectivity 224 between hidden excitatory layer 220 and output layer 240 is subject of synaptic plasticity implemented as rewarded STDP.

(2) The model incorporates "output synaptic scaling" where the amplitude of change of any synapse by STDP rule is inversely proportional to the total synaptic output of a pre-synaptic neuron. Implementation: Synaptic change determined by STDP rule (based on timing of pre/post spikes) is multiplied by scaling factor reward_scale=reward_scale$_0$*(1/Wi), where reward_scale$_0$ is constant and $W_i=SUM_j(W_{ij})$ is a total synaptic strength of all outgoing connections.

(3) The model incorporated synaptic input scaling implemented in such a way that:
  (a) Total synaptic input to a neuron in the network is modulated based on its long term activity. Implementation: Total synaptic input $W_j=SUM_i(W_{ij})$ to a given output neuron $O_j$ is set to be equal at each time step to the target synaptic input $W_{j0}$—a slow variable that varies over many time periods and depends on the activity of that neuron $O_j$ and activity of its pre-synaptic neurons. If a neuron $O_j$ repeatedly receives input but does not fire in response, the $W_{j0}$ is increased. If the neuron responds with multiple spikes the $W_{j0}$ is gradually reduced;
  (b) The weights of synaptic inputs to a neuron are rebalanced whenever a synaptic input is strengthened or weakened to maintain the same total of weights in aggregate. Implementation: After each STDP event synaptic scaling is applied: when any excitatory connection increases in strength, all the other excitatory connections incoming to that neuron decrease in strength by "scale_factor" to keep $W_j$ constant and equal to $W_{j0}$: $W_{ij}^{(n+1)}=W_{ij}^n$*scale_factor, where scale_factor=$W_{0j}/SUM_i(W_{ij}^n)$, $W_{ij}^n$ are synaptic weights right after STDP event but before scaling and $W_{ij}^{(n+1)}$ are synaptic weights after scaling. Note that $W_{j0}$ is subject to slow changes as described in (3)(a).

Figure 5:
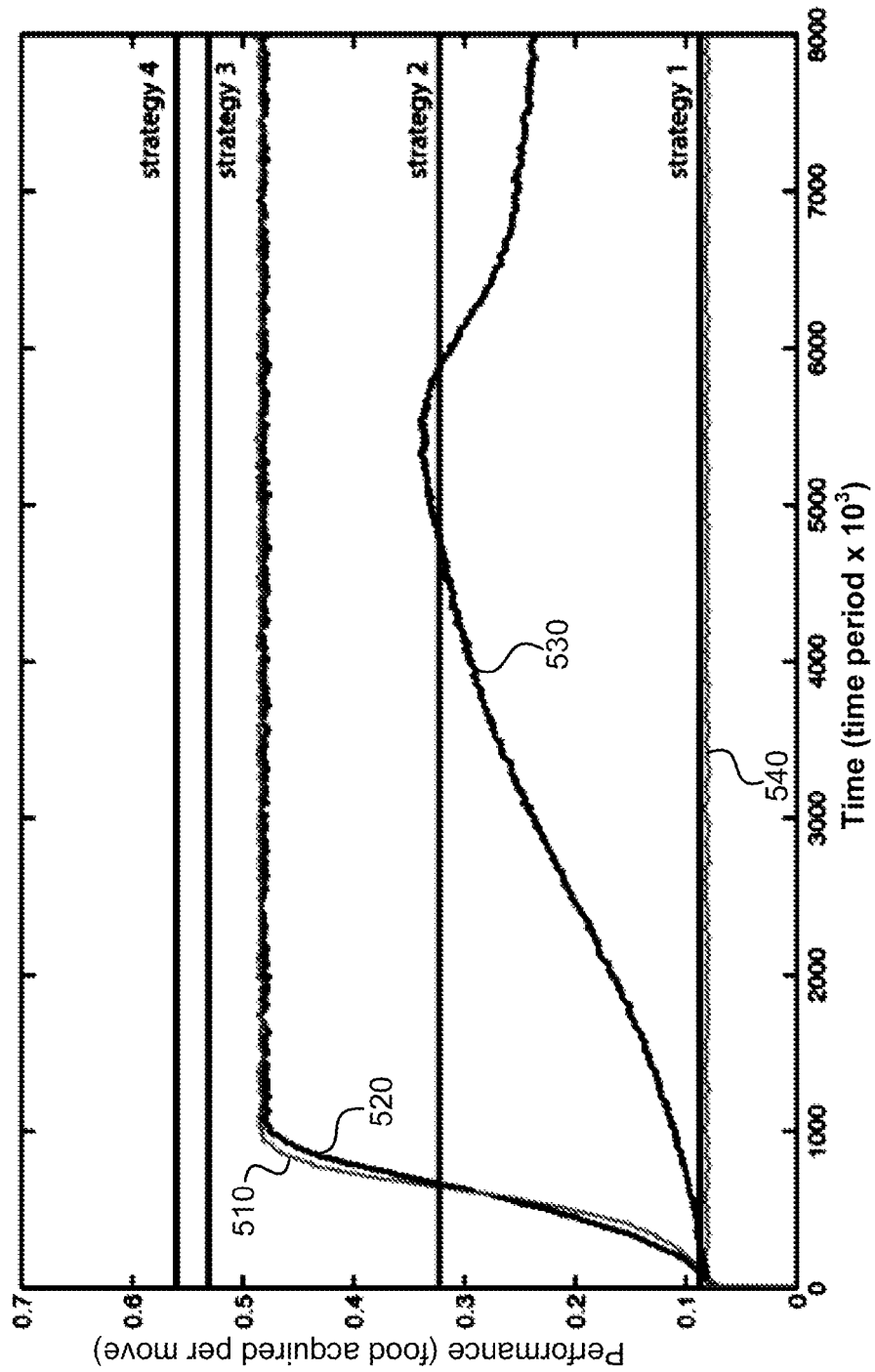
FIG. 5 are graphs illustrating the consequences of eliminating various features from the neural network model.

(4) The balancing of both incoming and outgoing synaptic connections (described in (2) and (3) above) was required to achieve high levels of learning performance, as shown in FIG. 5.

(5) A "hunger mechanism" activates after an extended period of not receiving food. When activated it causes the virtual entity to move in a random direction until it finds more food. It is used to prevent the virtual entity from moving in infinite loops during the learning process.

Figure 6:
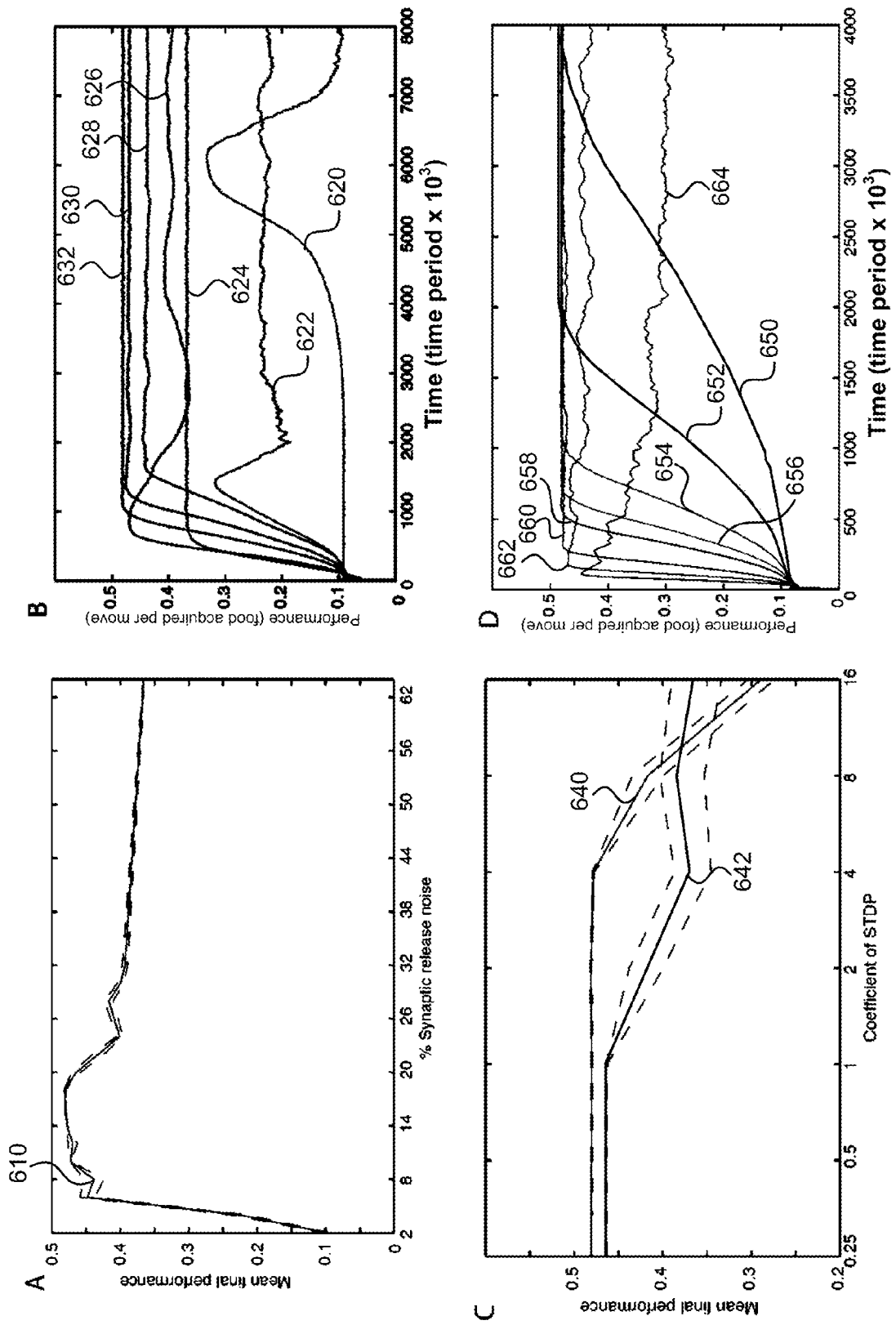
FIG. 6 are graphs illustrating the effect of noise and STDP properties on learning performance.

(6) Synaptic noise was implemented as variability in the magnitude of each individual synaptic event and was necessary for breaking out of local maxima of synaptic strength and therefore, to allow further increase of performance. Some tradeoff between final performance and learning speed was observed related to the level of noise. Higher noise levels continued to improve learning speed even though they resulted in the lower final performance (FIGS. 6A, B).

(7) The final performance was found to be maximized with lower STDP coefficient strengths. This is expected because it allows the network to more finely tune synaptic strengths. However, there is a tradeoff between final performance and learning speed as the rate of STDP changed. Higher STDP coefficients led to faster learning but at very high values the final performance was affected (FIGS. 6C,D).

Figure 7:
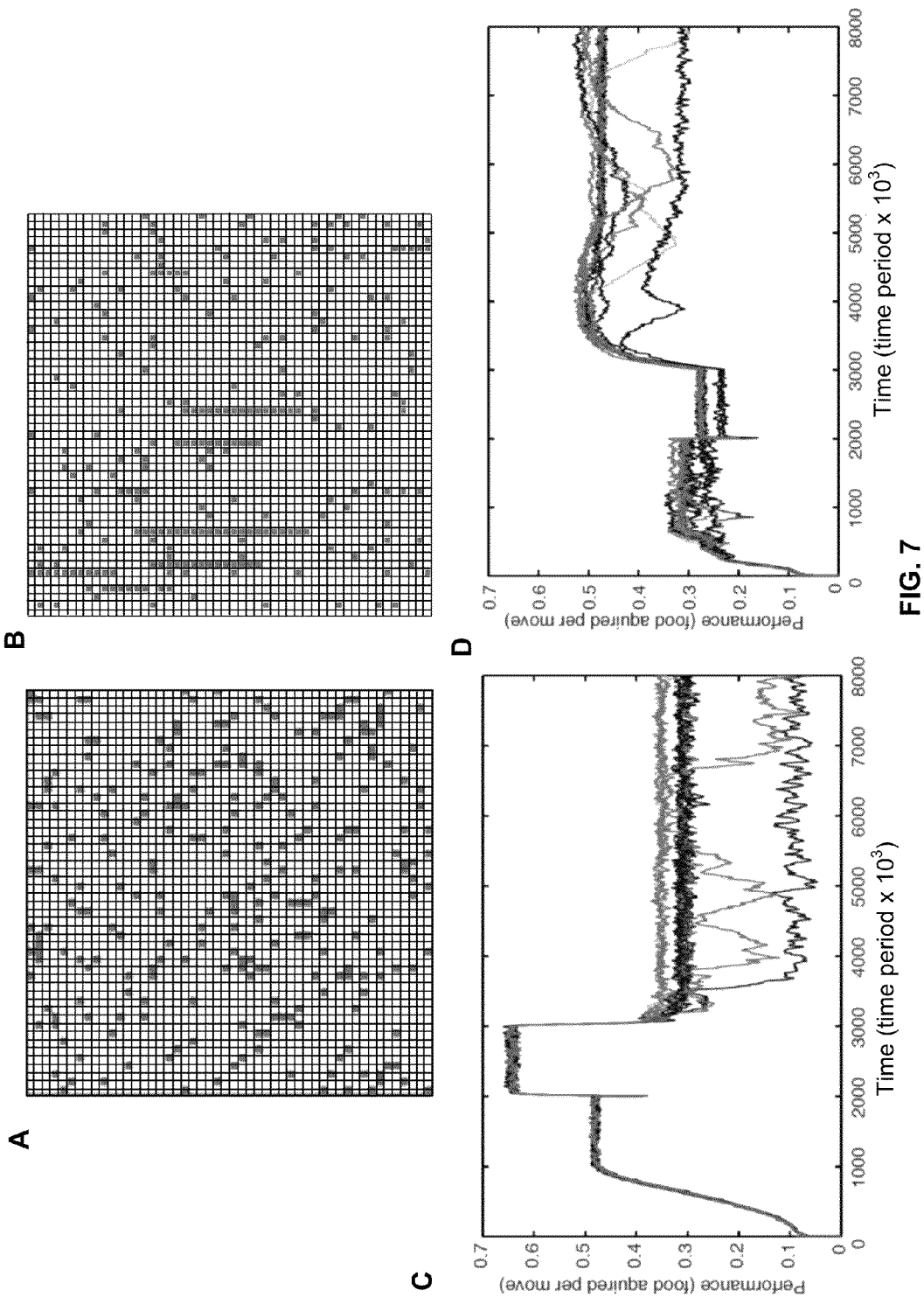
FIG. 7 are graphs of two iterations of foraging environments, one with random food distribution and the other with vertically biased food distribution and graphs illustrating the food acquired per move over time during, after, and under retraining conditions based on the two iterations of the foraging environment.
Figure 8:
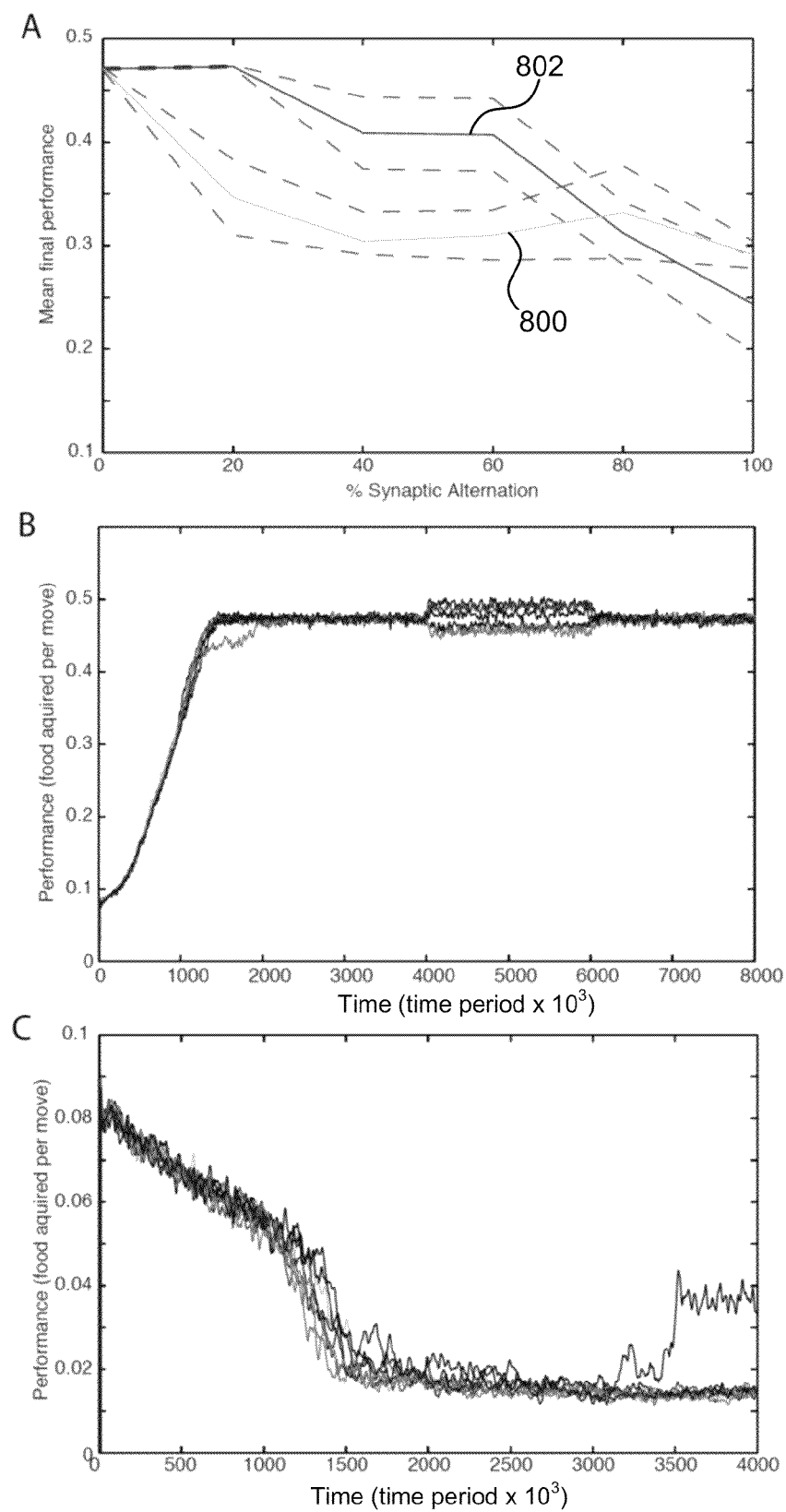
FIG. 8 are graphs illustrating the effect of random synaptic alteration.

8) The network trained in the random environment was found to be more successful (has higher performance) in the new (even specialized) environments (FIG. 7).
9) Repeated partial randomizing (random perturbations) of synaptic weights during training rescued many of the simulations from low performing states (FIG. 8).

According to embodiments, the neural network models were constructed of spiking neurons, the dynamics of which can be described by the following equations, which are a reduced model of a spiking neuron described by difference equations:

$$V_{n+1} = f_a(V_n, I_n + \beta_n),$$

$$I_{n+1} = I_n - \mu(V_n + 1) + \mu\sigma + \mu\sigma_n,$$

$$f_a(V_n, I_n) = \begin{cases} a(1-V_n)^{-1} + I_n, & V_n \leq 0 \\ a + I_n, & 0 < V_n < a + I_n \text{ and } V_{n-1} \leq 0 \\ -1, & a + I_n \leq V_n \text{ or } V_{n-1} > 0 \end{cases}$$

where $V_n$ is the relative membrane potential, $I_n$ is a slow dynamic variable describing the effect of slow conductances, and n is a discrete time-step (e.g., of approximately 0.5 ms according to the exemplary embodiment). Slow temporal evolution of $I_n$ was achieved by using small values of the parameter $\mu \ll 1$. Input variables $\beta_n$ and $\sigma_n$ were used to incorporate external current. $I_n^{ext}$ (e.g., synaptic input): $\beta_n = \beta^e I_n^{ext}$, $\sigma_n = \sigma^e I_n^{ext}$. The nonlinearity $f_a(V, I)$ was designed in the form of a piece-wise continuous function. To convert the dimensionless "membrane potential" V to the physiological membrane potential $V_{ph}$, the following equation was applied: $V_{ph} = V*50-15$ [mV]. This model, despite its intrinsic low dimensionality, produces a rich repertoire of dynamics and is able to mimic the dynamics of Hodgkin-Huxley-type neurons both at the single-neuron level and in the context of network dynamics. A fast spiking neuron model was implemented to simulate the neurons in the network.

To model synaptic interconnections, a conventional first order kinetic models of synaptic conductances rewritten in the form of difference equations was used:

$$g_{n+1}^{syn} = \gamma g_n^{syn} - \begin{cases} g_{syn}, & spike_{pre}, \\ 0, & otherwise, \end{cases}$$

and the synaptic current computed as:

$$I_n^{syn} = -g_n^{syn}(V_n^{post} - r_p),$$

where $g^{syn}$ is the strength of synaptic coupling, and indices pre and post stand for the presynaptic and postsynaptic variables, respectively. The first condition, "$spike_{pre}$," is satisfied when presynaptic spikes are generated. Parameter controls the relaxation rate of synaptic conductance after a presynaptic spike is received ($0 < \gamma < 1$). Parameter $V_{rp}$ defines the reversal potential and, therefore, the type of synapse: excitatory or inhibitory.

Foraging Environment

The foraging behavior took place in virtual foraging environment 100 of randomly distributed "food" particles in a 50×50 environmental grid. The environment comprises an area divided into grid that forms a plurality of grid locations 110 as illustrated in FIG. 1. Each grid location 110 either has food 112 or does not have food. According to embodiments, food was distributed randomly to various grid locations in the foraging environment.

According to embodiments, time in the model is divided into time periods. According to embodiments, each time period is of sufficient duration for the neural network to receive inputs, produce outputs, and return to a resting state. According to the exemplary embodiment, neurons receive an input signal at about the start of each time period. Output is produced resulting in the virtual entity moving toward the end of the time period. According to embodiments, each time period is 600-1000 processor cycles (approximately 300 ms, according to embodiments). However, time periods can be any duration that provides sufficient time to accomplish at least the receipt of input and produce an output (e.g., movement of one geographical unit or performance of an output signal).

Time is divided up into time periods. At the start of each time period the virtual entity receives input corresponding to the locations of nearby food. During the middle of the time period the virtual entity makes one move based on the activity of the output layer. The remainder of the time period acts as a "cooling off period" to allow neurons to return to the resting state. If the virtual entity moves to a grid square with food the food is moved form that square to a randomly selected new square; this is implemented to keep the density of food particles constant Exemplary Neural Network Model As illustrated in FIG. 2, neural network 200 comprises 156 map-based neurons 212, 222, 232, 242 in four groups arranged into three feed forward layers. Input layer 210 comprises a 7×7 layer (I) 210 of input neurons 212. Hidden layer comprises a 7×7 excitatory neuron layer (H) 220 and a 7×7 inhibitory neuron layer (HI) 230. Output layer comprises a 3×3 output neuron layer (O) 240. This structure provides a basic feedforward inhibitory circuit found in many biological structures, e.g, thalamocortical, hippocampal, olfactory, and others.

The virtual entity sees a 7×7 "visual" range of foraging environment locations surrounding the virtual entity, which comprises its virtual "visual field." The 7×7 "visual" range maps 1:1 input layer 210 (i.e., stimulus on the input layer is cued by what the virtual entity "sees" in its visual field.) The virtual entity is centered in the middle of the 7×7 visual range.

Input Layer

Input layer 210 comprises a 7×7 layer of input neuron 212. These input neurons 212 are analogous to sensory neurons for the 7×7 "visual" field. Each of the 49 input neurons 212, therefore, map to one and only one of the 49 locations that the virtual entity can "see." "Food" particles corresponded to depolarizing current that was applied to the corresponding neuron in the 7×7 input layer.

According to embodiments, input neurons 212 are non-synaptically stimulated by current injection sufficient to trigger a spike if there is food on the foraging environment location the neuron is mapped to. I.e., for each of the locations in the visual field that contains food, the input neuron that corresponds to that foraging environment location will be synaptically stimulated.

Each input neuron 212 ($I_i$, where i is neuron index) outputs to (1) one neuron 222 in excitatory hidden layer 220 by synapse 214 with strength from $W1_{ij}$ to $I_i$ to $H_j$ and (2) one neuron 232 in the inhibitory hidden layer 230 by synapse 216 with strength $W2_{ij}$ from $I_i$ to $HI_j$. This is one to one map, so $W1_{ij} > 0$, $W2_{ij} > 0$ only if i=j and $W1_{ij} = W2_{ij} = 0$ otherwise.

Hidden Layer

Each neuron 222 in excitatory hidden layer 220 (neuron H) or each neuron 232 in inhibitory hidden layer 230 (neuron $HI_i$) connects to each and every neuron 242 in output layer 240 ($O_j$) via synapses 224, 234 with synaptic strength $W_{ij}$ or $WI_{ij}$, respectably, as illustrated in FIG. 2. When the virtual entity is trained, the synaptic strengths between hidden layer neurons 222 and output layer neurons 242 will develop different strengths, which will dictate the behavior of the virtual entity.

Initially all synapses 224, 234 between hidden layers 220, 230 and output layer 240 have uniform connection strengths ($W_{ij}$=Const, $WI_{ij}$=Const, and independent on i or j). Thus, initially, all responses in output layer 240 are due to random variability in the activity of hidden layer output synapses 224, 234. This variability is inherent to all synaptic interactions between neurons caused by release noise of synapses. It is implemented as variability in synaptic release.

Output Layer

Output layer 240 comprises an 3×3 array of output neurons 242, each output neuron 242 corresponding with a foraging environment neuron in the 3×3 array of grid locations centered on the virtual entity's location in the foraging grid. In other words, each of output layer neuron 242 (except the center neuron) is mapped to a direction the virtual entity can move for that time period. The output layer neuron 242 ($O_j$) that spikes the greatest number of times during the early phase of a time period defines the direction of movement chosen for the virtual entity for that time period. If there is a tie the neuron that spikes first determines direction. If no neurons in the output layer fire then the virtual entity has a 98% probability of continuing in the direction it traveled during the previous time period, otherwise it turns 45 degrees in a random direction. This random variability prevents possible infinite loops of virtual entity movement during the learning process.

Thus, output layer 240 dictates the direction that the virtual entity will move for each time period. The virtual entity can move to any adjacent square, including diagonally, for a total of eight directions.

Hunger Mechanism

According to embodiments, a hunger mechanism activates after an extended period where the virtual entity does not move to a location in the foraging environment that contains food. When the hunger mechanism is activated, it causes the virtual entity to move in a random direction until it finds more food. It is used to prevent the virtual entity from moving in infinite loops as the neural network is trained. According to the exemplary embodiment, consecutive unrewarded moves were counted and the virtual entity switched to the "hunger mode" (moving in random direction) when the counter 50 moves were made without landing on a foraging environment location containing food.

Plasticity

Plasticity in our model is based on a rewarded STDP paradigm implemented between layers H and O. A spike in a post-synaptic neuron ($O_j$ of the output layer) which directly follows a spike in pre-synaptic neuron of the hidden layer) creates a "pre before post" event. Likewise a spike in a pre-synaptic neuron which directly follows a spike in post-synaptic neuron creates a "post before pre" event. Additional pre-synaptic spikes do not create additional post before pre STDP events.

The value of an STDP event is calculated using the following equation:

$$\text{event\_value} = \text{scale} * S * \exp(-|t_{pre\_spike} - t_{post\_spike}|/\tau)$$

Where scale is equal to −0.025 in the case of a post before pre event and 0.025 in the case of a pre before post event. Variable S is the strength of the connection. Time constant $\tau$=10 ms.

The STDP events are not immediately applied to the respective synapse $W_{ij}$ between neurons $H_i$ and $O_j$. Instead they are stored as traces for later use. According to embodiments, traces remain stored for five time periods and then are erased. However, any suitable period of time can be selected to retain a trace; the length of time selected to retain a trace is dependent on how long after a decision is made to move a direction it is relevant to reward that neuron for a "correct" move then food is later discovered. While still stored a STDP trace will have an effect whenever there is a rewarding or punishing event. If the network is rewarded the change in synaptic strength of the synapse $W_{ij}$ is described as:

$$dW_{ij} = (\text{event\_value}/(1+((t_{reward} - t_{trace\_creation})/\text{time period})))*\text{reward\_scale}$$

If the network is punished the change in synaptic strength is described as:

$$dW_{ij} = (\text{event\_value}/(1+((t_{reward} - t_{trace\_creation})/\text{time period})))*\text{punishment\_scale}$$

Punishment scale has a negative value of approximately 30% of reward scale. The network is rewarded when the virtual entity moves to a food location. It is punished when it moves to a location without food.

The scale of reward is increased in inverse proportion to the sum of the neurons outgoing synaptic strengths from hidden layer H to the output layer O:

$$\text{reward\_scale} = \text{reward\_scale}_0 * (1/W_i),$$

where $\text{reward\_scale}_0$ is constant and $W_i = \text{SUM}_j/W_{ij}$) is a total synaptic strength of all connections from specific neuron $H_i$ to all neurons $O_j$ of the output layer. Punishment scale, however, remains constant and equal 30% of $\text{reward\_scale}_0$ The effect of these rules is that the neurons with lower total output strength increase their output strength more easily. Creating competition between a neuron's synaptic outputs in this way prevents a single neuron from activating multiple output neurons simultaneously which would result in all activated connections being rewarded for a correct response caused by only one of the synapses.

Homeostatis

To ensure that all the output neurons maintained a relatively constant long term firing rate, the model incorporated homeostatic synaptic scaling. Without careful maintenance of homeostasis, learning mechanisms used in the model cause imbalance in the level of activity in the network and in the relative effectiveness of different components in the network. According to embodiments, this was overcome by introducing two basic mechanisms. One modulates total input to a neuron in the network based on its activity. The other modulates the level of plasticity in output connections. Together these mechanisms provided a stable activity levels which allowed for rewarded STDP based learning to occur.

To ensure that all the output neurons maintain specific firing rate, the model incorporated homeostatic synaptic scaling. The total synaptic input $W_j = \text{SUM}_i(W_{ij})$ to a given output neuron $O_j$ is set to be equal at each time step to the target synaptic input $W_j = W_{j0}$—a slow variable that varies over many time periods and depends on the activity of that neuron $O_j$ and activity of its pre-synaptic neurons. If a neuron $O_j$ repeatedly receives input but does not fire in response, the $W_{j0}$ is increased. If the neuron responds with multiple spikes the $W_{j0}$ is gradually reduced.

$$W_{j0}^{new} = W_{j0}*((1-D_{target}) + (D_{target}*(\text{target rate}/\text{fire rate}))), D_{target} = 0.001$$

$$\text{fire rate}^{new} = \text{fire rate}*(1-D_{fire}) + (D_{fire}*\text{firings this time period}), D_{fire} = 0.01$$

This update takes place every time period (1000 time steps, according to embodiments).

To ensure that total synaptic input $W_j$ remains unaffected by plasticity events of individual connections at individual time steps and equal to $W_{j0}$, a scaling process was implemented that occurs after each STDP event. When any excitatory connection increases in strength, all the other excitatory connections incoming to that neuron decrease in strength by "scale_factor" to keep $W_j = W_{j0}$:

$$W_{ij}^{n+1} = W_{ij}^{n} * \text{scale\_factor},$$

where scale_factor $= W_{0j}/\text{SUM}_i(W_{ij}^n)$, $W_{ij}^n$ are synaptic weights right after STDP event but before scaling and $W_{ij}^n$ are synaptic weights after scaling.

The model does not include mechanisms for inhibitory plasticity. All inhibitory connections $WI_{ij}$ incoming to neuron $O_j$ from all neurons $HI_i$ of the inhibitory layer have uniform strength. The sum of their inhibitory strength is held equal to the sum of the strength of all excitatory connections coming into the same neuron. In other words at the each time step $WI_{ij}$ is scaled so $WI_j = \text{SUM}_i(WI_{ij}) = -W_j$.

Training and Performance

Neural Network-Based Performance in a Random Foraging Environment

Over the course of the training period the network, which begins with a set of synaptic connections of uniform strength, develops into a network capable of producing near optimal foraging behavior. Rewarded STDP alone is not sufficient to learn foraging behavior due to difficulty maintaining homeostatic equilibrium. The total excitatory synaptic input to a neuron needs to be kept constant. This is done by uniformly scaling input strengths after rewarded STDP events to maintain a constant total synaptic input strength. Further the amplitude of STDP events to output connections needs to be scaled by the total output strength of the respective neuron. A degree of randomness in synaptic release provided better results.

Figure 4:
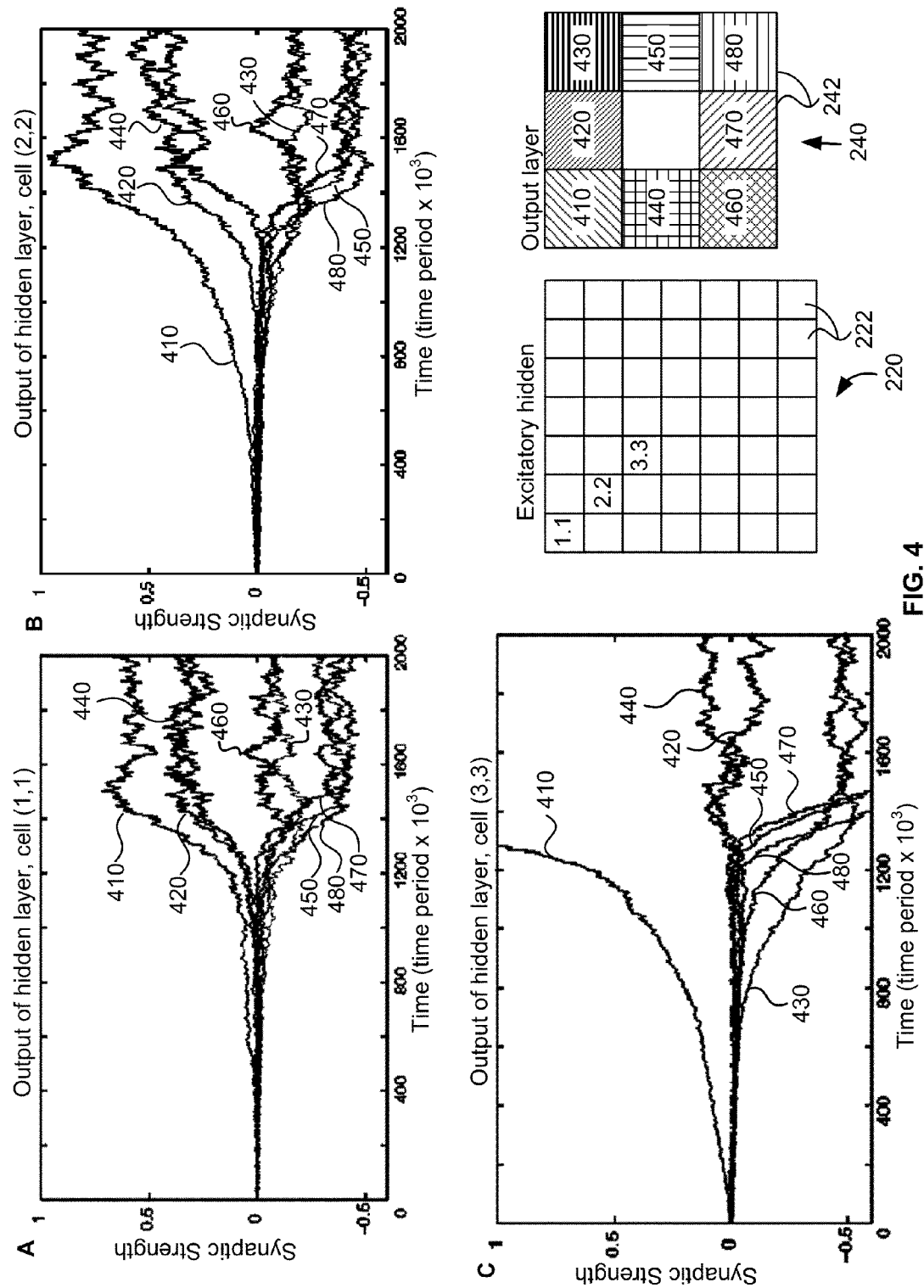
FIG. 4 are graphs illustrating of the trajectory of a virtual entity's movement in the virtual environment before training and after training, including a graph of the food acquired per move over time after training according to embodiments of a neural network disclosed herein.

In the default condition (synapse strength between hidden layers 220, 230 and output layer 240 uniform), output layer spikes only occurred due to random variation in the output of individual synaptic events from hidden layer 220, 230 to output layer 240. As a result the virtual entity using default settings initially moved primarily along a straight paths with occasional random turns, as illustrated in FIG. 4A.

On occasion an output spike was generated which resulted in the movement leading to successful event—"food acquisition." When this event occurred, neural network 200 was rewarded and the recently active synapses which were associated with this response were strengthened. Strengthening the synapses leading to food acquisition increased the probability of correct (toward food) movement at successive iterations. Over the course of the simulation the virtual entity learned not only to respond to input signaling the position of adjacent "food" but to more distant "food" as well. In general, once trained, the virtual entity was attracted toward higher concentrations of "food" with a bias toward "food" that is closer, as illustrated in the virtual entity's movement represented as a line in FIG. 4B.

To quantify performance of the model an exponential moving average was used which continually approaches the rate of "food" acquisition.

$$X(n) = X(n-1)*(1-A) + A*S,$$

where $X(n)$ is the performance score at the time of the current move, $X(n-1)$ is the performance score at the time of the previous move, $S = 1$ if "food" was obtained at this move and $S = 0$ otherwise, $A$ is an arbitrary positive constant, $A \ll 1$. In the exemplary embodiments, the value used was $A = 0.00001$. Qualitatively this expression gives a value that is continuously approaching the current rate of "food" acquisition per move.

It is helpful to compare this performance to other possible strategies for solving the given foraging problem. Four strategies were used to make this comparison, as illustrated in the horizontal lines in FIG. 3C. None of these strategies involved learning; the system performance was preprogrammed according to a particular strategy. Strategy 1 was a blind strategy, moving in straight lines with occasional random turns. Strategy 2 always collected adjacent "food" if available otherwise it moved according to strategy 1. Strategy 3 moved towards the closest "food" within three grid squares. Strategy 4 was a strong strategy that searched through all possible sets of moves within its visual field. It then choose the first move of the set of moves that will collect the most "food" with a bias toward obtaining "food" sooner.

Figure 3:
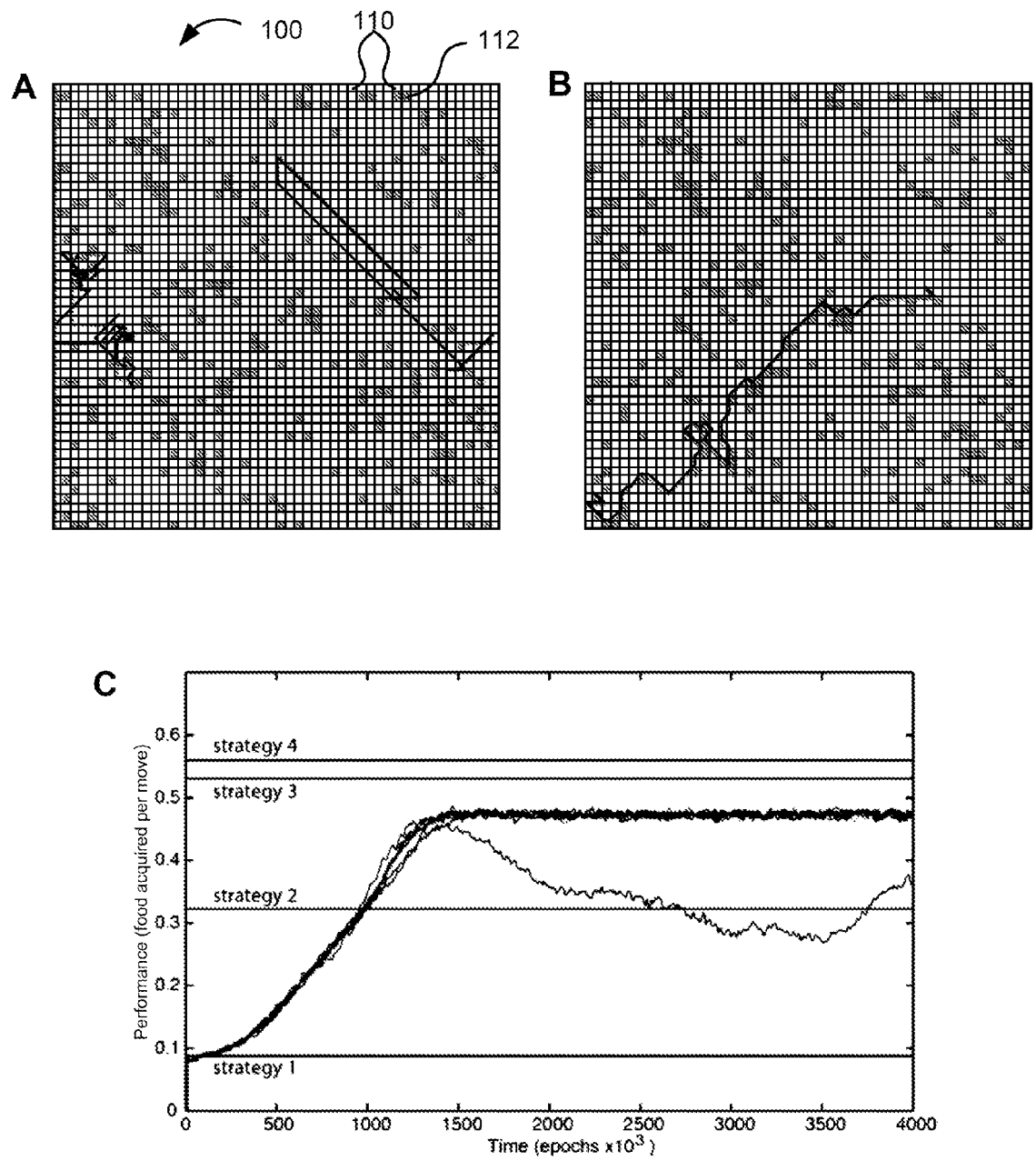
FIG. 3 are graphs illustrating embodiments of synapse strengths and how the synapse strengths correlate between the excitory hidden layer and the output layer during learning.

Illustrated in FIG. 3C are four different trials. The performance of the virtual entity varied in FIG. 3C (variation in each line) because of inherent noise in the model and the environment it forages in. Usually virtual entities using default model settings reached similar levels of performance, which was slightly below strategy 3. However, occasionally a trial would become trapped in local maxima resulting in lower overall learning performance, represented by the trial that falls below strategy 2 at around time period 3,000,000.

To evaluate synaptic changes induced by learning, the dynamics of synaptic weights were analyzed, as illustrated in FIGS. 4A-4C illustrate the evolution of the outgoing synaptic weights of three excitatory hidden layer neurons 222 that were located in the upper/left direction from the center of the layer (represented by 1,1; 2,2; and 3,3 of FIG. 3D). These neurons represented successive neurons in the top/left area of the "visual field" and sent connections to each neuron 242 in output layer 240. Synapse 224 from the upper/left neuron that was closest to the center of the hidden layer (neuron (3,3)) to the top left output neuron (trace 410) increased in strength as responses connecting activation of this hidden layer neuron 222, which represented the adjacent area in the upper/left direction, and movement in the upper/left direction were the most likely to be rewarded (FIG. 4C). Over time, however, synapses 224 to output neurons 242 that moved the virtual entity up and left (traces 420, 440, respectively) were also strengthened as responding to activation of these hidden layer neurons by moving in these directions was more likely to move the virtual entity toward "food" than away from it. The lower strength trace (430, 450, 460, 470, 480) connections allowed the network to integrate information from many input neurons. The network detected and responded to concentrations of "food" by summing multiple neuron inputs rather than just reacting to the individual inputs. The outgoing synapses 224 of other hidden layer neurons 222 located further from the center (neurons (1,1) and (2,2)) took longer to be modified by the learning process as there was a weaker correlation between a given response and a reward. The synaptic strengths of these neurons also stabilized at less extreme values giving them weaker influence over the direction of the movement. Finally, synapses connecting hidden layer neurons 222 in the top/left area of the visual field to the bottom/right output neurons (e.g., trace 430) decreased their strength, as they were least likely to trigger movement to the right direction.

Effect of Neural Network Model Changes on Performance

To evaluate the role of different mechanisms in the overall learning performance, mechanisms were eliminated. In each trial, one major feature of the model was removed and its performance over time was plotted, as shown in FIG. 5. Baseline model performance was represented by trace 510. In the first experiment (FIG. 5, trace 520) the punishment mechanism was turned off. The punishment mechanism applied the inverse and reduced value of the currently active STDP traces, as described above. The neural network was still rewarded when "food" was obtained, but no change occurred when "food" was not obtained. As shown, the learning rate was reduced slightly when punishment was turned off, but no other significant changes were observed.

In the second experiment (shown as trace 530), neural network output balancing was turned off, which reduced the rate outputs were strengthened by reward when the neuron had a large sum of output strengths. The rate at which outputs were strengthened was no longer dependent on the total output strength of the presynaptic neuron. This resulted in low and unstable performance, though the performance was still better than random motion. Low performance was primarily due to the formation of stable parameter sets that created local maxima of performance.

In the third experiment (shown as trace 540), variability in synaptic release was eliminated. Under this condition the depolarization applied to the neuron was always directly proportional to the strength of the synapse. This resulted in no activity in the output neurons and consequently no learning. The virtual entity moved in a straight line turning only due to the random chance (p=0.02). This chance to turn randomly was explicitly implemented to the model and present in all conditions. The output neurons did not fire because the amount of inhibition and excitation to a given output neuron were equal in magnitude.

Finally, in a fourth experiment (not shown in FIG. 5), input balancing was removed such than the total incoming synaptic strength to a neuron was allowed to change when STDP traces were rewarded. Without this homeostatic mechanism, the sum of the input strengths to the output neurons either fell very low or became very high. Indeed, when positive STDP events were rewarded the temporal correlation between pre- and postsynaptic activity became stronger. This increased the likelihood of further potentiating events. This led to runaway synaptic dynamics and the network quickly became unstable and the virtual entity moved in random or repetitive circles until the network far exceeded physiological range of synaptic changes.

Noise

Synaptic noise is important to achieve high model performance. FIGS. 6A, 6B show data corresponding to a series of experiments where the level of random noise in synaptic release was varied between 2% and 64%. Performance was maximized with noise levels between 8% and 16%, but dropped off at higher or lower levels of noise, as illustrated by trace 610 in FIG. 6A (twenty-five simulations were run under each noise condition and final performance was recorded after 4 million moves; bounding lines show standard error), however it remained relatively high even for high levels of noise. Furthermore, some tradeoff between final performance and learning speed related to the level of noise was observed, as illustrated in FIG. 6B. FIG. 6B shows a plot of mean performance over time with variable levels of noise in synaptic release represented by different lines. Twenty-five simulations were run under each noise condition for over 4 million moves. Each trace shows a different noise level 2% (trace 620), 4% (trace 622), 8% (trace 628), 12% (trace 630), 16% (trace 632), 32% (trace 626), 64% (trace 624). Higher noise levels continued to improve learning speed even though they resulted in the lower final performance.

FIGS. 6C and 6D show data corresponding to a series of simulations where the STDP strength was varied across a wide range, altering the rate at which synapses could change. Numbers shown are relative to a default of 1. FIG. 6C shows a plot of mean final performance with variable STDP coefficient strength. Twenty-five simulations were run under each STDP coefficient condition and final performance was recorded after 4 million moves. Two sets were run with different noise levels: 16% release noise (trace 640) and 8% (trace 620). Bounding lines show standard error. From FIG. 6C it can be seen that final performance is maximized with lower STDP coefficient strengths. This is expected because it allows the network to more finely tune synaptic strengths. At higher levels of synaptic noise, the network became greatly more tolerant of higher rates of STDP coefficients.

FIG. 6D, however, shows a tradeoff between final performance and learning speed as the rate of STDP changed. FIG. 6D shows a plot of mean performance over time for different STDP strengths. Twenty-five simulations were run for each STDP strength over 4 million moves. Release noise is set to 16%. STDP strength: trace 650—0.25; trace 652—0.5; trace 654—1; trace 656—1.5; trace 658—2; trace 660—4; trace 662—8; trace 664—16. Higher STDP coefficients led to faster learning but at very high values the final performance was affected.

Effect of Environmental Changes on the Network Performance

The change in the model performance following changes in the "food" environment was also studied. The model learned the statistical properties of the food distribution and not a specific pattern of the food particles, changing the random environment to another one characterized by similar statistics of food distribution did not affect performance of the trained model. Therefore, the effect of changing the random environment to a food distribution environment biased to particular pattern of food particles was studied, as shown in FIG. 7A-D. FIGS. 7A and 7B illustrated two foraging environments. FIG. 7A shows a foraging environment with random distribution of food. FIG. 7B shows a foraging environment with the distribution of food vertically biased. In FIG. 7C, performance over time of the neural network starting in a normal environment then being switched to a vertically biased environment at 2,000,000 iterations. Learning was turned off and all synaptic weights were held constant until time period 3,000,000 when learning was turned on again. Similarly, FIG. 7D shows performance over time of the network starting in a vertically biased environment then being switched to a normal environment at time period 2,000,000. Learning was turned off and all synaptic weights were held constant until time period 3,000,000 when learning was turned on again.

As shown in FIG. 7C, the virtual entity was initially trained on a normal, random distribution (FIG. 7A) and the environment was then changed to a vertically biased distribution (FIG. 7B) at the midpoint of the experiment (time period 2,000,000). At this time learning was turned off. The vertically biased environment was created by biasing toward placing "food" directly above existing food. This tended to arrange "food" into vertical columns. The network training in the random foraging environment allowed it to be even more successful in the vertically biased foraging environment than it was in its normal environment because arrangement of the "food" was more likely to have clusters of connected food. When learning was turned back (at time period 3,000,000), the simulation performance rapidly reduced. The reason for this is that connections involved in acquiring "food" in a single direction were far more likely to receive reinforcement than those which indicated any other direction. The result of this excessive reward was that all other responses were unable to compete for synaptic strength. This could be seen as similar to repetitive motions observed in motor stereotypies. Although the model could continue to obtain "food" when the "food" was directly above or below it, it was much less capable of dealing with other situations when there was no "food" vertically adjacent.

In the second experiment shown in FIG. 7D, the network was initially trained in the vertically biased foraging environment. It reached lower maximum performance than the neural networks trained in a random environment achieved under either environmental condition. When the environment was changed to the random distribution and learning was frozen (at time period 2,000,000), performance was further reduced because when a small number of responses regularly resulted in the majority of the rewards received, performance was negatively affected. Turning training back on again (at time period 3,000,000) led to improvement in performance, but it was hypothesized that residual training in the synapses from the vertically biased environment led to more variation in the retraining in the random environment.

Effect of the Random Synaptic Strength Perturbations on Neural Network Performance In the standard starting condition of the network, all excitatory synaptic weights from hidden layer 220, 230 to output layer 240 had the same value. To test effect of the variability in initial weight distribution, these weights were initially randomly varied to observe the effect on performance. This randomization was performed by multiplying each excitatory weight by a random number selected from a flat distribution centered on one (e.g., for 20% variation each synaptic weight was multiplied by a number from 0.8 to 1.2). This represented initial change in the synaptic strength as opposed to the noise in synaptic release, which occurs each time the presynaptic neuron fires. Due to the input side balancing mechanisms described previously, the sum total of synaptic inputs to any one neuron, and hence to the layer as a whole, was unchanged by this randomization. The average performance in shown as trace 800 in FIG. 8A. Each point represents the average of 8 trials with different initial set of synaptic weights; bounding lines represent standard error. The maximum performance attained under conditions of high initial randomization was highly variable. The performance was always higher than random and was often similar to the best performance of a network that only responds to "food" in adjacent squares. A sizable minority of simulations, even among those groups with high initial variability, still attained normal performance levels.

In another set of experiments the weights were once again initiated with the same level of variability (+/−20%). In addition, every one million iterations the weights were partially randomized again using the same approach as for initial weights (multiplied by a new number drawn from the same distribution). The results are represented as trace 802 in FIG. 8A. Surprisingly for moderate levels of variability the repeated random perturbations of synaptic strength rescued many of the simulations from low performing states. It can be reasonably assumed that the added noise helped the network escape from local performance maxima. At the very high levels of variation, however, no benefit of random noise could be seen.

When the same method of randomizing synaptic weights was applied to the trained network that had already achieved high performance levels, there was no observable lasting effect on performance (FIG. 8B). The level of variation used in these experiments was 50% and learning was turned off and synapses were held at a fixed strength from time periods 4,000,000 to 6,000,000. In many cases such networks experienced a decrement in performance while learning was frozen but took very little time to return to normal once learning mechanisms were restored. In a few rare cases performance actually improved slightly during the non-learning phase with applied perturbations. Any improvements vanished once learning was restored. This solution, however, could resist even strong synaptic weight perturbations.

Finally, in an attempt to train the network to avoid "food" the reward and punishment conditions were reversed (FIG. 8C). The network was rewarded every move when it did not obtain "food" and punished when it did. Due to the much larger number of empty spaces and the fact that empty spaces are not removed when moved to, this represented a much easier problem. The model was successful in avoiding "food" but did not explore the entire space. It is still worth noting that no other changes were necessary for the network to perform well under these new conditions.

Biological Analogs to the Neural Network Model

Many of the mechanisms in the neural network model have analogs to biological mechanisms seen in experiments. Rewarded STDP operates similarly to the way dopamine is proposed to affect learning circuits. Balancing of the strengths of a number of inputs to a single neuron in order to maintain a more constant level of input has been observed in a variety of experimental investigations. Indeed, rises of intracellular $[Ca^2]$ are not restricted to the activated synapses but take place also at synapses, which were not active during the plasticity induction, e.g., due to bursts of backpropagating action potentials. This $[Ca^2]$ increase can lead to plasticity at non-active synapses—heterosynaptic plasticity, often also referred to as non-associative plasticity. Homeostatic scaling of intrinsic and synaptic properties responsible for adjustment of the firing thresholds in response to neuron activity has been well documented in live neurons.

Competition between multiple outputs of the same neuron, as incorporated into exemplary models disclosed herein, makes intuitive sense but has not been a subject of any great deal of study. It is believed that competition between multiple outputs is useful in preventing a small number of neurons from dominating the activity of the neural networks.

Discussion

In this study, rewarded STDP to a biologically inspired spiking neural network model representing a basic neuronal circuit with feedforward excitatory and inhibitory projections was implemented. Such network is capable of solving a task of learning to map correctly a multidimensional input space (represented by patterns of activation of the input neurons) to the multidimensional output space (neuronal activity representing decision). The learning task was formalized in the context of the basic foraging behavior in a simulated foraging environment of randomly distributed "food" particles. Information was not shared between neurons except through synaptic communication and a global reward signal from the network. The foraging problem used in this model provided a more naturalistic setting for learning using a simple neural network.

The rewarded STDP model was sufficient to learn the foraging task only when additional rules controlling balance of synaptic weights were implemented. The canonical simplified version of STDP alone was not sufficient to perform the successful learning. Without careful maintenance of synaptic homeostasis, learning mechanisms used in the model cause imbalance in the level of activity in the network and in the relative effectiveness of different components in the network. This was overcome by introducing two basic homeostatic mechanisms. One rebalances the weights of synaptic inputs to a cell whenever a synaptic input is strengthened or weakened to maintain the same total of weights. The other modulates total synaptic input to a cell in the network based on its long term activity. Furthermore, the rate of synaptic facilitation was inversely proportional to the total synaptic output of a cell. Together these mechanisms provided a stable activity levels which allowed for rewarded STDP based learning to occur.

It has been demonstrated previously that rewarded STDP is capable of providing reinforcement learning. What was particularly distinct in this disclosure, however, is the complexity of the input/output mapping. A great deal of complexity emerges when diversity is added in the number of possible inputs and outputs. As the number of input/output possibilities increases new features are required to allow responses to compete against one another. This requires the network to be able to achieve and maintain a broad distribution of synaptic connections and to avoid runaway synaptic dynamics, a common effect of STDP alone.

Rewarded STDP is homeostatically unbalanced. Multiple efforts have been applied to augment the learning rules to prevent the runaway synaptic dynamics. When realistic homeostatic mechanisms developed in previous studies were applied, the network could learn to produce better results than random chance. However, more advanced balancing mechanisms were required to achieve higher levels of performance. Primarily it was necessary that (1) the total strength of a cell incoming connections remained constant during STDP events, (2) the sum of outgoing connection was biased towards maintaining a similar value across development. If either of these mechanisms were not implemented, performance greatly suffered. Interestingly, the synaptic rules of input and output balancing disclosed herein that allowed the neural network models disclosed herein to achieve high performance levels are biologically realistic.

In the neural network model disclosed herein, as in behaving animals, reward causes increased probability of repetition of behaviors preceding the reward. This is even true in situations where a single behavior that reward too often can be repeated pathologically. In the model this occurred when the environment was changed to feature primarily vertically arranged food squares. The "over learning" of a small set of responses is also observed in animals when the reward system malfunctions such as motor stereotypies after repeated amphetamine application.

When activity levels are stable the network can still encounter serious performance issues when certain neurons develop many strong outputs. This can result in a small number of neurons controlling activity in a large portion of the output layer. Some outputs of these neurons are beneficial and so all of the activity of these neurons are rewarded at above chance rates. Reducing the rate of gain in synaptic strength resulting from rewarded STDP events prevents this by allowing under represented neurons to more easily compete for representation in the next layer. Competition between multiple outputs of the same neuron, as incorporated into this model, makes intuitive sense but has not been a subject of any great deal of study. This disclosure predicts that such competition is important in preventing a small number of neurons from dominating the networks activity and suggests that future experiments look for evidence of such mechanisms. There are also other ways to implement such competition, e.g., through lateral inhibition between output neurons found in many biological systems.

Algorithm

Figure 9:
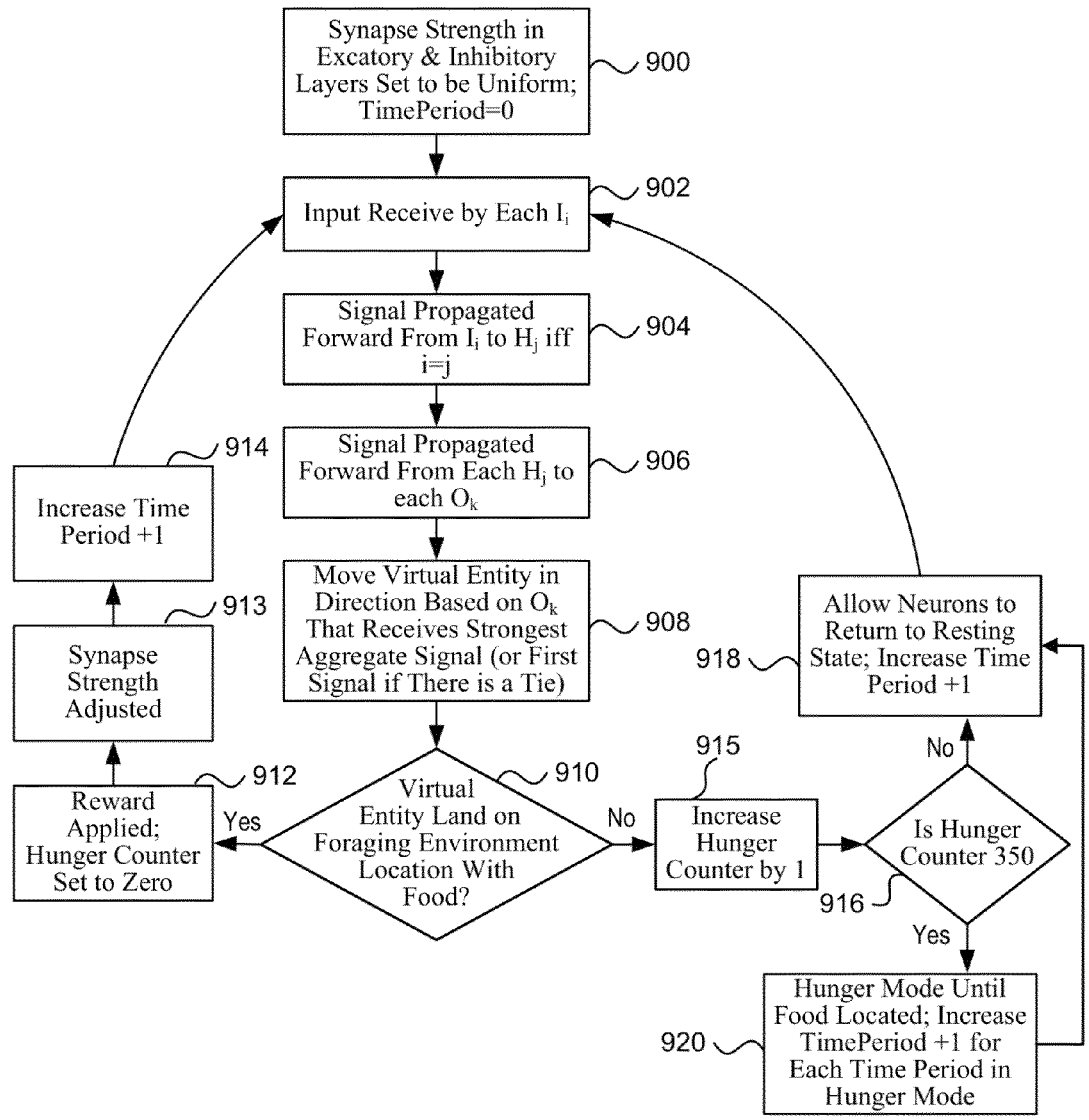
FIG. 9 are flow diagrams showing an embodiment for an algorithm for implementing neural network models according to this disclosure.

The neural network models disclosed herein can be implemented as both a system in a computer or other artificial intelligence, or as computer implemented methods. Accordingly, FIG. 9 illustrates a high level algorithm for implementing the systems and methods disclosed herein. As illustrated in FIG. 9, a method for teaching a neural network is disclosed to be implemented with the neural network model disclosed herein. The neural network model can be implemented in silico as a system of arrays in a conventional database or as standalone programming. In other words, the foraging environment can be a 50×50 array, wherein each element in the array has at least one data elements: whether food is present. Likewise, according to embodiments, the neural networks disclosed herein are be implemented as a plurality of arrays. In essence, the neural network can be implemented as a graph, each vertex being a neuron and each edge being a synapse. The mathematical models disclosed herein are used to calculate the values of input, synapse strength, and output Accordingly, FIG. 9 illustrates a method for performing the tasks disclosed herein. In process 900, which is the start of the flow diagram, synapses 224, 234 are set to be uniform prior to commencing with training the neural network in the foraging environment. At this point, the time period index is set to zero.

In operation 902, input is received by the input layer 210. Each input neuron 212 in input layer is receives a spike if there is food in the corresponding location of the foraging environment relative to the virtual entity. For each input neuron 212 that is stimulated, a spike is propagated to the corresponding excitatory neuron 222 and inhibitory neurons 232 of the excitatory hidden layer 220 and inhibitory hidden layer 230 as disclosed herein in process 904.

Signals from hidden layers 220 or 230 are propagated from hidden neurons 222 or 232, respectively to each and every output neuron 242 via synapses 224 or 234, respectively in operation 906. In operation 908, movement is determined in the output layer as described herein, and the virtual entity is moved.

Whether the virtual entity moves to a location that has food in foraging environment is determined in operation 910. If the virtual entity does move to a location in the foraging environment that has food, then a reward is applied in operation 912 (and the hunger counter is set to zero), and the synapse strengths are adjusted as disclosed herein in operation 913. In operation 914, the time period is increased by one after the time elapses, and input is again received in operation 902.

If the virtual entity does not move to a location with food in the foraging environment in operation 910, then the hunger counter is increased by one in operation 915. In operation 916, if the hunger is lesser than or equal to 50, then the time period is allowed to relapse (neurons return to resting state), the time period is increased by one in operation 918, and input is again received in operation 902. If the hunger counter is greater than or equal to 50 in operation 916, then in operation 920, the hunger mode is initiated and the virtual entity makes one move for time period as disclosed herein until food is located.

Figure 10:
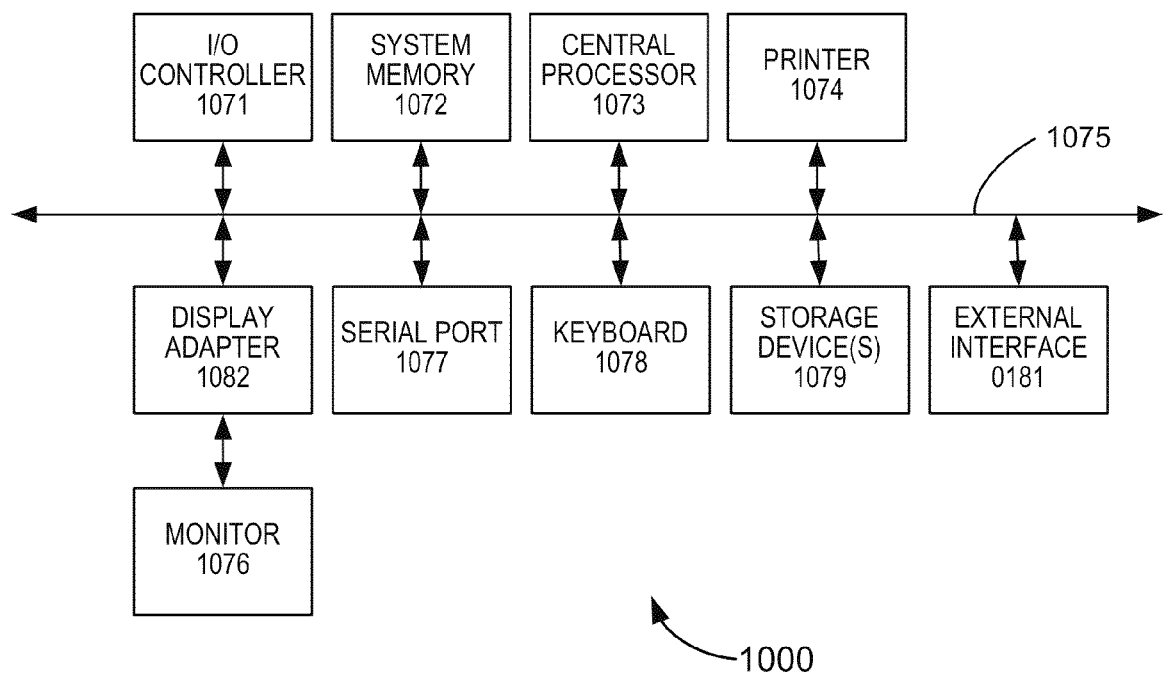
FIG. 10 is a block diagram of an embodiment of a computer.

FIG. 10 shows a block diagram of an example computer system 1000 usable with system and methods according to embodiments of the present invention.

Any of the computer systems mentioned herein may utilize any suitable number of subsystems. Examples of such subsystems are shown in FIG. 10 in computer apparatus 1000. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 10 are interconnected via a system bus 1075. Additional subsystems such as a printer 1074, keyboard 1078, storage device(s) 1079, monitor 1076, which is coupled to display adapter 1082, and others are shown. Peripherals and input/output (I/O) devices, which couple to I/O controller 1071, can be connected to the computer system by any number of means known in the art, such as serial port 1077. For example, serial port 1077 or external interface 1081 (e.g. Ethernet, Wi-Fi, etc.) can be used to connect computer system 1000 to a wide area network such as the Internet, a mouse input device, or a scanner. The interconnection via system bus 1075 allows the central processor 1073 to communicate with each subsystem and to control the execution of instructions from system memory 1072 or the storage device(s) 1079 (e.g., a fixed disk, such as a hard drive or optical disk), as well as the exchange of information between subsystems. The system memory 1072 and/or the storage device(s) 1079 may embody a computer readable medium. Any of the data mentioned herein can be output from one component to another component and can be output to the user.

A computer system can include a plurality of the same components or subsystems, e.g., connected together by external interface 1081 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The invention claimed is:

1. A computer product comprising a non-transitory computer readable medium storing a plurality of instructions that when executed control neural network on a computer system to self-learn to solve a complex problem, the instructions comprising:

in a time period for a neural network comprising an input layer of input neurons, a hidden layer of hidden neurons, and an output layer of output neurons, each input neuron having first synapses in electrical or chemical communication with at least one hidden neuron and each hidden neuron having second synapses in electrical or chemical communication with a plurality of the output neurons:

receiving an input in at least one input neuron;

propagating a first electrical or chemical communication from the at least one input neuron that received the input to at least one hidden neuron via at least one first synapse;

propagating a second electrical or chemical communication from the at least one hidden neuron that received the first communication from the input neuron to a plurality of output neurons, the second communication having variable strength for each hidden neuron to each of the plurality of output neurons in which the hidden neuron is in communication according to a strength of each second synapse;

making a decision based on the second communication according to a rule;

providing a reward if the result of the decision contributes to the solving of the problem;

wherein if a reward is provided, the strength of second synapses that contributed to the solving of the problem are adjusted, whereby the neural network is more likely to repeat the decision in at future time periods;

wherein second synapses are adjusted from decisions made in prior time periods; and wherein the strength of the second synapses are adjusted whereby an amount of adjustment of the second synapse is inversely proportional to a total synaptic output of the hidden layer neuron to the output layer.

2. The method of claim 1, wherein the second synapses are at least partially randomized periodically during a training period.

3. The method of claim 1, wherein the strengths of the second synapses are uniform during a first time period.

4. The method of claim 1, wherein each input neuron is in communication with a single hidden neuron.

5. A computer product comprising a non-transitory computer readable medium storing a plurality of instructions that when executed control neural network on a computer system to self-learn to solve a complex problem, the instructions comprising:

in a time period for a neural network comprising an input layer of input neurons, a hidden layer of hidden neurons, and an output layer of output neurons, each input neuron having first synapses in electrical or chemical communication with at least one hidden neuron and each hidden neuron having second synapses in electrical or chemical communication with a plurality of the output neurons:

receiving an input in at least one input neuron;

propagating a first electrical or chemical communication from the at least one input neuron that received the input to at least one hidden neuron via at least one first synapse;

propagating a second electrical or chemical communication from the at least one hidden neuron that received the first communication from the input neuron to a plurality of output neurons, the second communication having variable strength for each hidden neuron to each of the plurality of output neurons in which the hidden neuron is in communication according to a strength of each second synapse;

making a decision based on the second communication according to a rule;

providing a reward if the result of the decision contributes to the solving of the problem;

wherein if a reward is provided, the strength of second synapses that contributed to the solving of the problem are adjusted, whereby the neural network is more likely to repeat the decision in at future time periods;

wherein second synapses are adjusted from decisions made in prior time periods; and wherein the second synapses are adjusted whereby original weights of all synaptic communications to the output layer neuron are rebalanced whenever the strength of the second synaptic is adjusted, whereby the same total weight of synaptic communications to the output layer neuron is maintained during each time period.

6. A computer product comprising a non-transitory computer readable medium storing a plurality of instructions that when executed control neural network on a computer system to self-learn to solve a complex problem, the instructions comprising:

in a time period for a neural network comprising an input layer of input neurons, a hidden layer of hidden neurons, and an output layer of output neurons, each input neuron having first synapses in electrical or chemical communication with at least one hidden neuron and each hidden neuron having second synapses in electrical or chemical communication with a plurality of the output neurons:

receiving an input in at least one input neuron;

propagating a first electrical or chemical communication from the at least one input neuron that received the input to at least one hidden neuron via at least one first synapse;

propagating a second electrical or chemical communication from the at least one hidden neuron that received the first communication from the input neuron to a plurality of output neurons, the second communication having variable strength for each hidden neuron to each of the plurality of output neurons in which the hidden neuron is in communication according to a strength of each second synapse;

making a decision based on the second communication according to a rule;

providing a reward if the result of the decision contributes to the solving of the problem;

wherein if a reward is provided, the strength of second synapses that contributed to the solving of the problem are adjusted, whereby the neural network is more likely to repeat the decision in at future time periods;

wherein each input neuron is in communication with a single hidden neuron; and wherein the hidden neurons are divided into an excitatory group of hidden neurons and an inhibitory group of hidden neurons;

wherein each input neuron is in communication with one excitatory hidden neuron via an excitatory first synapse and one inhibitory neuron via an inhibitory first synapse.

7. The method of claim 6, wherein each excitatory hidden neuron is in communication with each and every output neuron via an excitatory second synapse and each inhibitory hidden neuron is in communication with each and every output neuron via an inhibitory second synapse.

8. The method of claim 7, wherein the decision made by the output neurons is a direction to move a virtual entity in a foraging environment.

9. A method of for inducing self-learning in a neural network implemented on a computer comprising:

in a time period for a neural network comprising an input layer of input neurons, a hidden layer of hidden neurons, and an output layer of output neurons, each input neuron having first synapses in electrical or chemical communication with at least one hidden neuron and each hidden neuron having second synapses in electrical or chemical communication with a plurality of the output neurons:

receiving an input in at least one input neuron;

propagating a first electrical or chemical communication from the at least one input neuron that received the input to at least one hidden neuron via at least one first synapse;

propagating a second electrical or chemical communication from the at least one hidden neuron that received the first communication from the input neuron to a plurality of output neurons, the second communication having variable strength for each hidden neuron to each of the plurality of output neurons in which the hidden neuron is in communication according to a strength of each second synapse;

making a decision based on the second communication according to a rule;

providing a reward if the result of the decision contributes to the solving of the problem;

wherein if a reward is provided, the strength of second synapses that contributed to the solving of the problem are adjusted, whereby the neural network is more likely to repeat the decision in at future time periods;

wherein second synapses are adjusted from decisions made in prior time periods; and wherein the strength of the second synapses are adjusted whereby an amount of adjustment of the second synapse is inversely proportional to a total synaptic output of the hidden layer neuron to the output layer.

10. The method of claim 9, wherein the second synapses are at least partially randomized periodically during a training period.

11. The method of claim 9, wherein the strengths of the second synapses are uniform during a first time period.

12. The method of claim 9, wherein each input neuron is in communication with a single hidden neuron.

13. A method of for inducing self-learning in a neural network implemented on a computer comprising:

in a time period for a neural network comprising an input layer of input neurons, a hidden layer of hidden neurons, and an output layer of output neurons, each input neuron having first synapses in electrical or chemical communication with at least one hidden neuron and each hidden neuron having second synapses in electrical or chemical communication with a plurality of the output neurons:

receiving an input in at least one input neuron;

propagating a first electrical or chemical communication from the at least one input neuron that received the input to at least one hidden neuron via at least one first synapse;

propagating a second electrical or chemical communication from the at least one hidden neuron that received the first communication from the input neuron to a plurality of output neurons, the second communication having variable strength for each hidden neuron to each of the plurality of output neurons in which the hidden neuron is in communication according to a strength of each second synapse;

making a decision based on the second communication according to a rule;

providing a reward if the result of the decision contributes to the solving of the problem;

wherein if a reward is provided, the strength of second synapses that contributed to the solving of the problem are adjusted, whereby the neural network is more likely to repeat the decision in at future time periods;

wherein second synapses are adjusted from decisions made in prior time periods; and wherein the second synapses are adjusted whereby original weights of all synaptic communications to the output layer neuron are rebalanced whenever the strength of the second synaptic is adjusted, whereby the same total weight of synaptic communications to the output layer neuron is maintained during each time period.

14. A method of for inducing self-learning in a neural network implemented on a computer comprising:

in a time period for a neural network comprising an input layer of input neurons, a hidden layer of hidden neurons, and an output layer of output neurons, each input neuron having first synapses in electrical or chemical communication with at least one hidden neuron and each hidden neuron having second synapses in electrical or chemical communication with a plurality of the output neurons:

receiving an input in at least one input neuron;

propagating a first electrical or chemical communication from the at least one input neuron that received the input to at least one hidden neuron via at least one first synapse;

propagating a second electrical or chemical communication from the at least one hidden neuron that received the first communication from the input neuron to a plurality of output neurons, the second communication having variable strength for each hidden neuron to each of the plurality of output neurons in which the hidden neuron is in communication according to a strength of each second synapse;

making a decision based on the second communication according to a rule;

providing a reward if the result of the decision contributes to the solving of the problem;

wherein if a reward is provided, the strength of second synapses that contributed to the solving of the problem are adjusted, whereby the neural network is more likely to repeat the decision in at future time periods;

wherein each input neuron is in communication with a single hidden neuron; and wherein the hidden neurons are divided into an excitatory group of hidden neurons and an inhibitory group of hidden neurons;

wherein each input neuron is in communication with one excitatory hidden neuron via an excitatory first synapse and one inhibitory neuron via an inhibitory first synapse.

15. The method of claim 14, wherein each excitatory hidden neuron is in communication with each and every output neuron via an excitatory second synapse and each inhibitory hidden neuron is in communication with each and every output neuron via an inhibitory second synapse.

16. The method of claim 15, wherein the decision made by the output neurons is a direction to move a virtual entity in a foraging environment.

* * * * *